Feb. 27, 1940.  G. J. CAMPBELL, JR  2,191,441
METHOD OF FORMING CHAIN LINKS
Filed Aug. 3, 1938  3 Sheets-Sheet 1
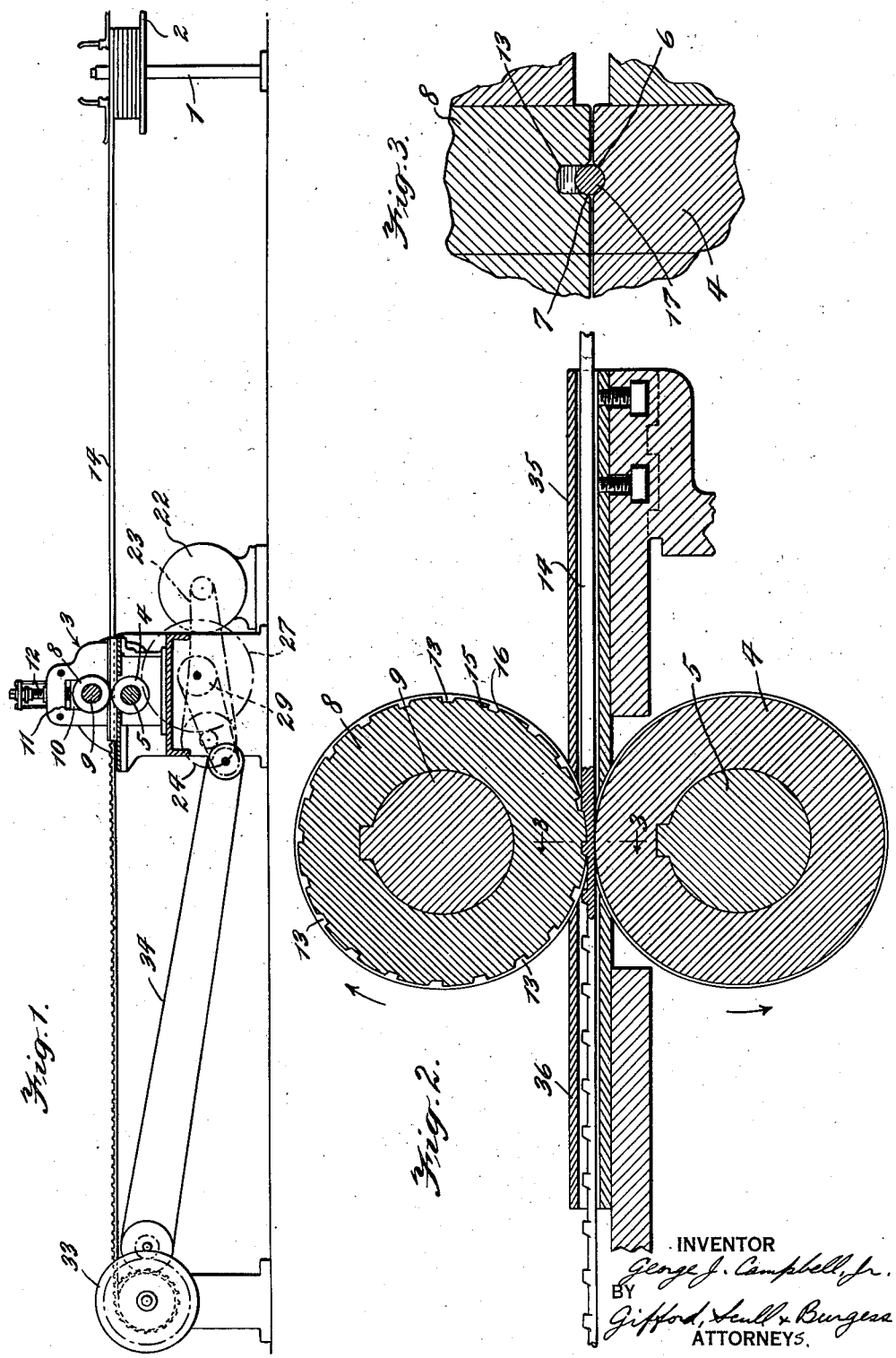
INVENTOR
George J. Campbell, Jr.
BY Gifford, Scull & Burgess
ATTORNEYS.

Feb. 27, 1940. G. J. CAMPBELL, JR 2,191,441
METHOD OF FORMING CHAIN LINKS
Filed Aug. 3, 1938 3 Sheets-Sheet 2

INVENTOR
George J. Campbell, Jr.
BY
Gifford, Scull & Burgess
ATTORNEYS

Feb. 27, 1940.  G. J. CAMPBELL, JR  2,191,441
METHOD OF FORMING CHAIN LINKS
Filed Aug. 3, 1938  3 Sheets-Sheet 3
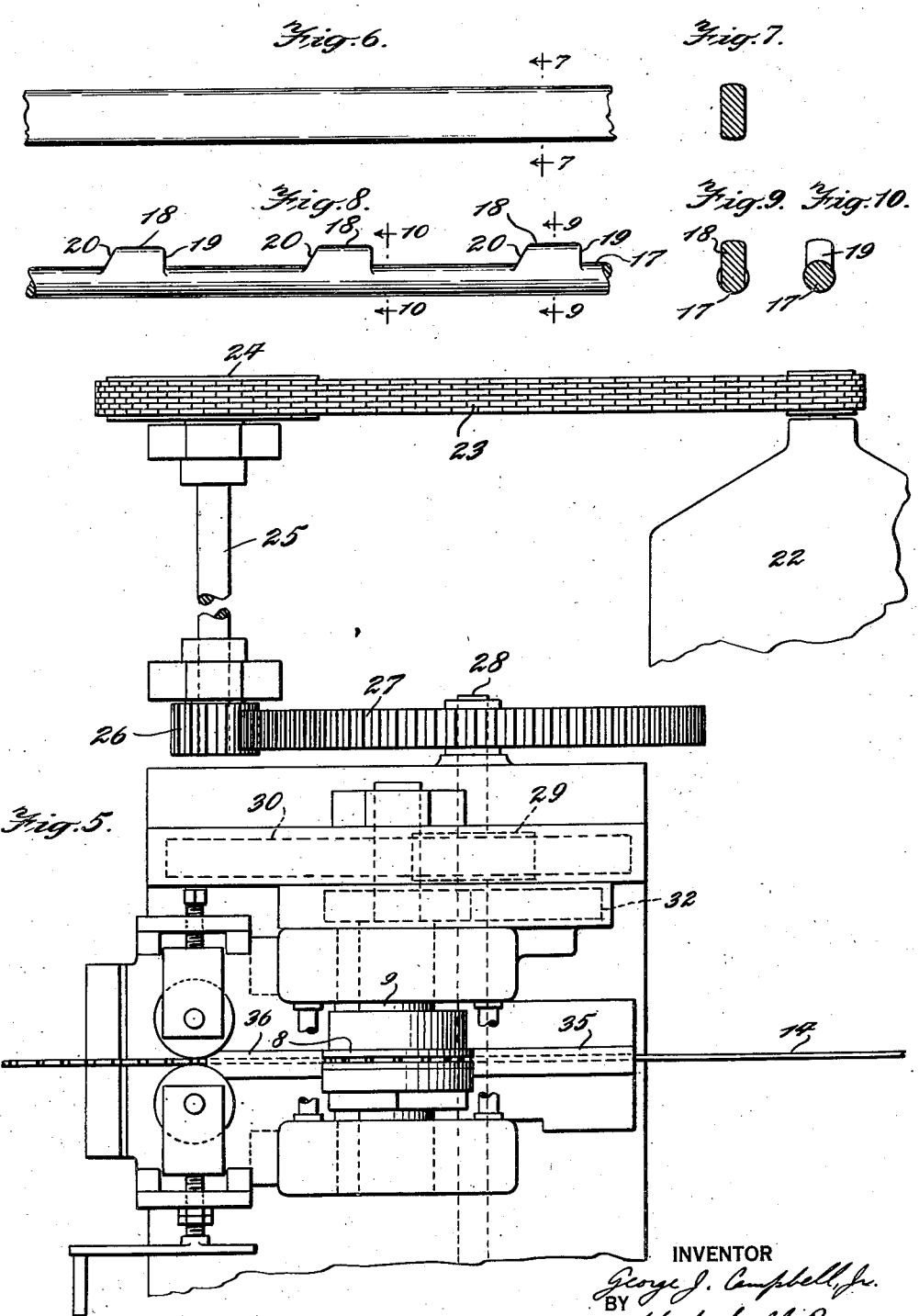
INVENTOR
George J. Campbell Jr.
BY
Gifford, Scull & Burgess
ATTORNEYS Patented Feb. 27, 1940

2,191,441

UNITED STATES PATENT OFFICE 2,191,441

METHOD OF FORMING CHAIN LINKS

George J. Campbell, Jr., York, Pa., assignor to International Chain & Manufacturing Company, York, Pa., a corporation of Pennsylvania Application August 3, 1938, Serial No. 222,764

3 Claims. (Cl. 59—35)

This invention relates to a novel and improved method of forming chain links, and will be best understood from the following description and the annexed drawings, in which I have shown a selected embodiment of a machine for practicing the new method.

In the drawings:

Fig. 1 is a side elevation, partly in section, of a machine for practicing the method;

Fig. 2 is a view on a greatly enlarged scale taken through the rolls and the work shown in Fig. 1;

Fig. 3 is a fragmentary section on the line 3—3 of Fig. 2;

Fig. 5 is a plan view of the apparatus appearing in Fig. 4;

Fig. 6 is a vertical view of part of the bar from which the link is made;

Fig. 7 is a view on the line 7—7 of Fig. 6;

Fig. 8 is a longitudinal view of the bar after being formed;

Fig. 9 is a section on the line 9—9 of Fig. 8;

Fig. 10 is a section on the line 10—10 of Fig. 8;

Figure 4:
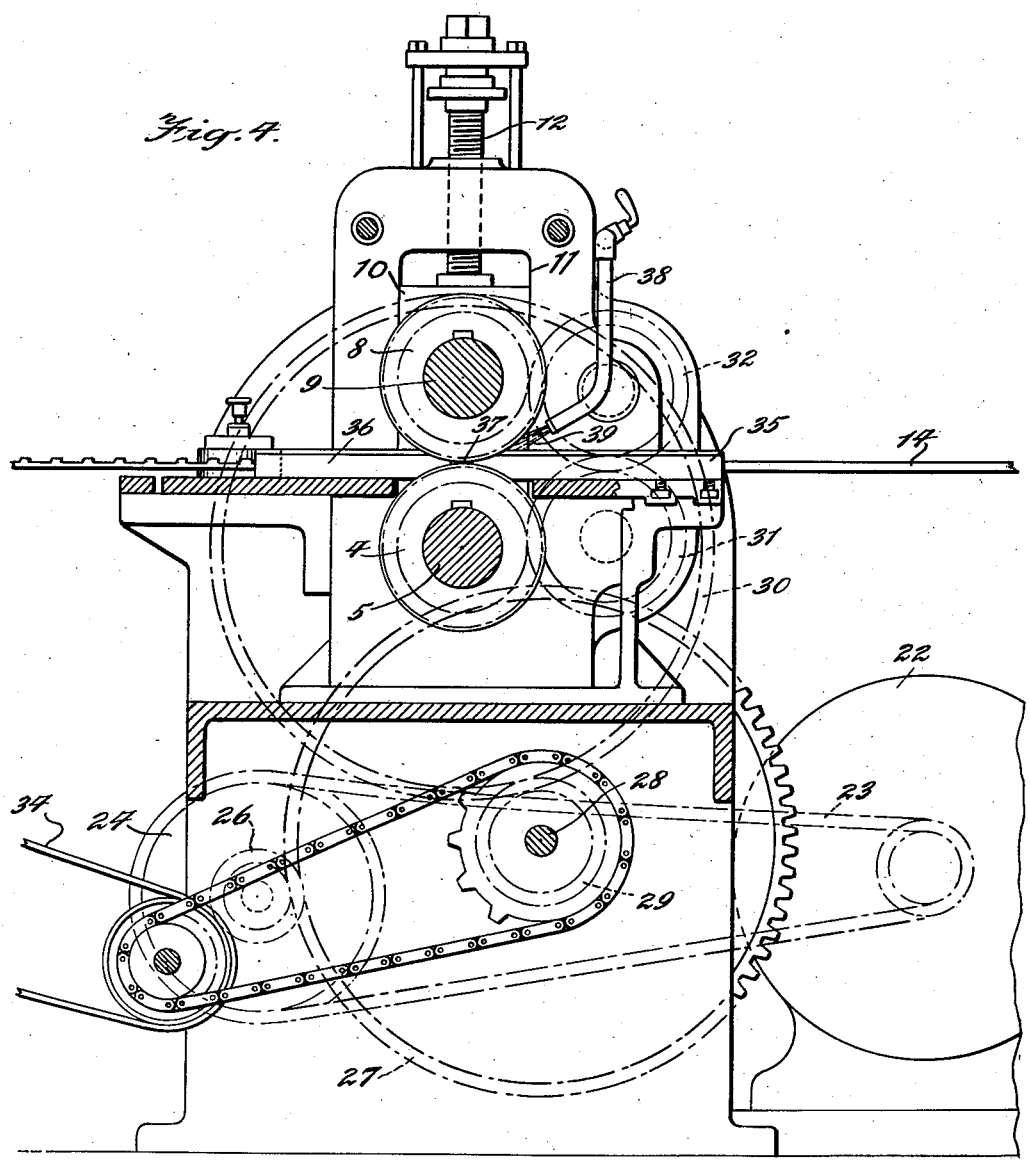
Fig. 4 is a fragmentary view of part of the apparatus shown in Fig. 1 but on a greatly enlarged scale, this figure being taken approximately on the same plane as Fig. 1.

The invention will be shown and described as used in the manufacture of chain stock for use in making reinforced lug links for cross chains of the general type shown in my Patent No. 2,093,547, granted September 21, 1937. Accordingly, the invention will be described in connection with work performed on a continuous bar, rod, or wire, which for convenience will be referred to as a bar.

Referring first to Fig. 1, I have shown at 1 a standard upon which is mounted a spool 2 containing a continuous bar which is flexible enough so that it may be pulled from the spool and fed continuously through the forming machine. This forming machine is indicated generally at 3 and comprises a lower roll 4 secured to a shaft 5 in stationary bearings. The periphery of the roll 4 is provided with a groove 6 which is generally circular in cross section and which registers with a corresponding groove 7 in a roll 8 mounted on a shaft 9 secured in bearings 10 which may be moved vertically in guideways 11. The bearings 10 are held in proper position by means of adjusting screws 12.

The groove 7 in the roll 8 is formed at regularly spaced intervals with recesses 13 extending from the groove inwardly towards the center of the roll. When one of the recesses is on a line joining the centers of the two shafts 5 and 9, the distance from the bottom of the groove 6 to the bottom of that recess may be substantially the same as the depth or thickness of the bar 14. This bar is to be fed between the rolls in the cold-forming operation and, according to one procedure, the bar may be formed of ordinary chain stock which comes as a continuous cylindrical bar. This bar may be flattened to the form shown in Figs. 6 and 7 and then fed between the rolls and into the grooves 6 and 7 with the greatest dimension of the bar vertical. The two rolls are then rotated in the direction indicated by the arrows in Fig. 2, and the bar is fed through the grooves. During this feeding, the bar is cold, although, if for any reason the original material has been found to be too hard, it may be softened by annealing. However, for ordinary steels and by making the rolls sufficiently rugged, ordinary chain stock may be used at the hardness at which it usually comes from the mill.

The end of the bar is fed into engagement with the rolls and, as the rolls rotate, the bar is drawn into the grooves in the rolls. The material of the bar is pressed together by the groove 6 and the part of the groove 7 which comes between the recesses 13 so that at spaced intervals the bar is pressed and reduced in cross-sectional area, to the desired configuration. In the present instance, this configuration is substantially cylindrical, as seen in Figs. 3 and 10. The parts of the bar which register with the recesses 13 will be pressed into those recesses and the entire bar will be elongated. In fact, there seems to be a general flowing of metal and a rearrangement thereof. Actual tests indicate that the bar passing through the rolls is elongated on the order of 40%.

The recesses 13 are provided with transverse walls, one of which, designated 15, is arranged substantially radially of the roll, whereas the opposite transverse wall 16, which for convenience may be referred to as the leading wall, since it first contacts with the work, is inclined or, in other words, it diverges from any radius passing through the bottom of the recess. I have found that this shape of wall aids materially in the cold-forming of the metal in the bar.

When the bar leaves the rolls, it has the form indicated in Fig. 2 and better shown in Figs. 8, 9, and 10. That is, it has a cylindrical body 17 from which project lugs or projections 18. Each projection has one end edge 19 which has been formed by the wall 15 of a recess and this is substantially at right angles to the axis of the body

Figure 11:
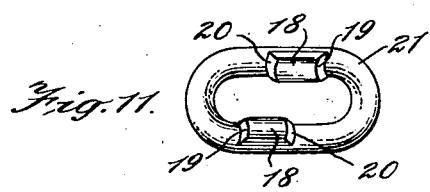
Fig. 11 is a view of a chain link which may be made from the product of Fig. 8.

17. The opposite end edge 20 of the same lug is inclined as indicated in Fig. 8, this edge having been formed by the wall 16. These lugs are designed in this instance for use in a reinforced link 21 (Fig. 11) of a cross chain which may be used on tire chains or emergency units, and the sharp edges 19 are so disposed as to prevent or minimize skidding lengthwise of the chain which, as is well known in the art, will be transversely of the tire on which the chain is mounted. This link, of course, will be formed in the usual manner by cutting a length of stock from the bar and bending it to the desired form, with the two ends abutting, and then welding those abutting ends. The link is preferably twisted, as the invention is particularly useful with a twisted link of the form shown in my aforesaid Patent 2,093,547.

In Figs. 1, 4, and 5, I have indicated diagrammatically suitable driving connections for the rolls and for other parts. The numeral 22 indicates a motor, on the shaft of which is a chain drive 23 engaging a sprocket 24 on a shaft 25. This shaft has a pinion 26 meshing with a gear 27 on a shaft 28. On this shaft is a pinion 29 meshing with a gear 30 secured to the shaft 5, thus positively rotating the lower roll 4. The upper roll 8 is likewise positively driven in unison with the roll 4 by means of pinions 31 and 32 which mesh with each other and which respectively mesh with pinions on the shafts 5 and 9, as shown in Fig. 4. Of course, it is to be understood that the driving connection shown is merely illustrative of any suitable driving means.

I have also shown at the left of Fig. 1 a take-up spool 33 upon which the cold-formed bar is wound, and this spool may be driven by the belt 34 through suitable driving connections which are indicated in Fig. 1, but which it is not deemed necessary to describe in detail.

The work may be supplied with suitable guides 35 and 36 on opposite sides of the throat 37 formed where the rolls come closest together. Preferably, these guides are somewhat larger than the work so that the work may pass freely through the guides, and the guides are not intended to exert any substantial pressure on the work in forming it.

A pipe 38 may be provided to discharge a cooling liquid 39 into the throat, as is well known in the art.

The invention has been found very satisfactory when practiced according to the illustrated embodiment. I am aware, however, that the invention may be practiced in other specific circumstances and therefore I do not intend to limit myself except by the appended claims.

I claim:

1. The method of forming a chain link which comprises feeding a flat bar between forming rolls while cold, and there compressing spaced portions of one edge of the bar while still cold to form spaced projections, severing a length of said bar having one or more of said projections thereon, and bending said length into a link.

2. The method of forming a chain link which comprises feeding a bar between forming rolls while cold, and there compressing spaced portions of the bar while still cold to form spaced projections, severing a length of said bar having one or more projections thereon, and bending said length into a link.

3. The method of forming a chain link which comprises feeding a bar between forming rolls while cold, and, while the bar is still cold, compressing spaced portions thereof and stretching the bar, thus forming spaced projections on the bar, severing a length of said bar having one or more projections thereon, and bending said length into a link.

GEORGE J. CAMPBELL, Jr.